US008665489B2

(12) United States Patent
Ray et al.

(10) Patent No.: US 8,665,489 B2
(45) **Date of Patent: *Mar. 4, 2014**

(54) LASER PRINTING PROCESS USING LIGHT CONTROLLED WETTABILITY

(75) Inventors: Elton T. Ray, Lakeville, NY (US); Thomas Robson, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 1253 days.

This patent is subject to a terminal disclaimer.

(21) Appl. No.: 12/510,705

(22) Filed: Jul. 28, 2009

(65) Prior Publication Data

US 2011/0026050 A1 Feb. 3, 2011

(51) Int. Cl.
*H04N 1/40* (2006.01)

(52) U.S. Cl.
USPC ............................................ 358/1.9; 101/465

(58) Field of Classification Search
USPC .................... 358/1.9, 2.1; 101/465–467, 471; 399/237–241, 245
See application file for complete search history.

(56) References Cited

U.S. PATENT DOCUMENTS

| | | | | |
|---|---|---|---|---|
| 5,320,789 | A | 6/1994 | Nishii et al. | |
| 6,146,798 | A | 11/2000 | Bringans et al. | |
| 6,182,569 | B1 | 2/2001 | Rorke et al. | |
| 6,238,839 | B1 * | 5/2001 | Tomita et al. | 430/278.1 |
| 7,020,355 | B2 | 3/2006 | Lahann et al. | |
| 7,194,956 | B2 | 3/2007 | Mori et al. | |
| 2005/0235852 | A1 | 10/2005 | Leenders et al. | |
| 2007/0137509 | A1 | 6/2007 | Fork | |
| 2008/0041257 | A1 * | 2/2008 | Teng | 101/453 |
| 2011/0023740 | A1 | 2/2011 | Ray et al. | |

FOREIGN PATENT DOCUMENTS

| | | | |
|---|---|---|---|
| EP | 1798606 | | 6/2007 |
| JP | 11258785 | A * | 9/1999 |

OTHER PUBLICATIONS

U.S. Patent Application filed of even date herewith, of Elton T. Ray, entitled "Offset Printing Process Using Light Controlled Wettability" 24 pages specification, 10 drawing sheets.

Ho Sun Lim et al., UV-Driven Reversible Switching of a Roselike Vanadium Oxide Film Between Superhydrophobicity and Superhydrophilicity, J. Am. Chem. Soc., Mar. 15, 2007, pp. 4128-4127.

http://www.scientificamerican.com/article, Beyond Self-Cleaning Switchable Surfaces, Jul. 21, 2008, 2 pages.

Peter Forbes, http://www.scientificamerican.com/articie, Self-Cleaning Materials: Lotus-Leaf Inspired Nanotechnology, Jul. 30, 2008, 6 pages.

P. Matusche, et al., Water Soluble Photo-resins Based on Polymeric Azo Compounds, Reactive Polymers, Elsevier Science B.V., 1995, pp. 271-278.

* cited by examiner

*Primary Examiner* — Thomas D Lee
*Assistant Examiner* — Stephen M Brinich
(74) *Attorney, Agent, or Firm* — Marylou J. Lavoie

(57) ABSTRACT

A light controlled laser imaging method includes exposing a surface layer of an imaging member substrate to a first expose source to render the surface layer uniformly hydrophilic, wherein the surface layer comprises a compound having reversible light controlled wettability whereby the surface layer is reversibly hydrophilic and hydrophobic; exposing the surface layer to a second expose source in an image-wise fashion to render image areas of the surface layer hydrophobic; exposing the surface layer to a polar liquid wherein the polar liquid attracts to non-image hydrophilic areas; exposing the surface layer to a hydrophobic liquid colorant wherein the hydrophobic liquid colorant attracts to hydrophobic image areas; contacting the surface layer with an image receiving substrate to transfer the image thereto; fixing the image; and optionally, treating the surface layer to remove residual hydrophobic liquid colorant.

19 Claims, 3 Drawing Sheets

LASER PRINTING PROCESS USING LIGHT CONTROLLED WETTABILITY

CROSS-REFERENCE TO RELATED APPLICATIONS

Copending application U.S. Ser. No. 12/510,672; filed concurrently herewith, entitled "Offset Printing Process Using Light Controlled Wettability," with the named inventors Elton T. Ray and Thomas Robson, the disclosure of which is totally incorporated herein by reference, discloses a lithographic printing method comprising exposing an imaging surface layer of a printing plate to a first expose source to render the surface layer uniformly hydrophilic; wherein the surface layer comprises a polymer film including a compound having reversible light controlled wettability whereby the surface layer is reversibly hydrophilic and hydrophobic; wherein the surface layer is disposed over a portion of the printing plate imaging surface; or wherein the surface layer is disposed over substantially all of the printing plate imaging surface; exposing the surface layer to a second expose source in an image-wise fashion to render image areas of the surface layer hydrophobic; exposing the surface layer to a polar liquid wherein the polar liquid attracts to non-image hydrophilic areas; exposing the surface layer to a hydrophobic liquid colorant wherein the hydrophobic liquid colorant attracts to hydrophobic image areas; contacting the surface layer with an offset receiving member to transfer the image to the offset receiving member; contacting the offset receiving member with an image receiving substrate to transfer the image thereto; optionally, fixing the image; and optionally, treating the surface layer to remove residual hydrophobic liquid colorant.

BACKGROUND

The present disclosure relates to imaging processes, methods, and devices. More particularly, the present disclosure relates to laser printing processes, methods and devices using light controlled wettability of an imaging member.

In electrophotography, an electrophotographic substrate containing a photoconductive insulating layer on a conductive layer is imaged by first uniformly electrostatically charging a surface of the substrate. The substrate is then exposed to a pattern of activating electromagnetic radiation, such as, for example, light. The light or other electromagnetic radiation selectively dissipates the charge in illuminated areas of the photoconductive insulating layer while leaving behind an electrostatic latent image in non-illuminated areas of the photoconductive insulating layer. This electrostatic latent image is then developed to form a visible image by depositing finely divided electroscopic marking particles on the surface of the photoconductive insulating layer. The resulting visible image is then transferred from the electrophotographic substrate to a member, such as, for example, an intermediate transfer member or directly to a final recording substrate, for example, a print substrate, such as paper, or to another member. This image developing process can be repeated as many times as necessary with reusable photoconductive insulating layers.

Electrophotographic imaging members (i.e. photoreceptors) are well known. Electrophotographic imaging members are commonly used in electrophotographic (xerographic) processes having either a flexible belt or a rigid drum configuration. These electrophotographic imaging members sometimes comprise a photoconductive layer including a single layer or composite layers. These electrophotographic imaging members take many different forms. For example, layered photoresponsive imaging members are known in the art.

Photoconductive photoreceptors containing highly specialized component layers are also known. For example, a multilayered photoreceptor employed in electrophotographic imaging systems sometimes includes one or more of a substrate, an undercoating layer, an intermediate layer, an optional hole or charge blocking layer, a charge generating layer (including a photogenerating material in a binder) over an undercoating layer and/or a blocking layer, and a charge transport layer (including a charge transport material in a binder). Additional layers such as one or more overcoat layers are also sometimes included.

An exemplary known laser printing device and process 10 is illustrated in FIG. 1. Device 10 includes drum 12 having one or more layers including a photoconductive surface layer 14 and an electrically grounded conductive substrate 16. The drum 12 is electrically charged via charging device 18 and an image is projected or written onto drum 12 via laser 20, which includes mirror component 22, while the drum is rotating. A motor (not shown) engages drum 12 for rotating the drum in the direction indicated by the arrow 24 to advance successive portions of photoconductive surface layer 14 through the various processing components disposed about the path of movement of drum 12. In the areas where the light shines, the charge on drum 12 is altered thereby recording onto drum 12 an electrostatic latent image indicated by dotted line 26. Various methods are known to irradiate the charged portion of photoconductive surface 14 for recording the latent image thereon. For example, a properly modulated scanning beam of electromagnetic radiation (for example, a laser beam) can be used to irradiate the desired portion of photoconductive surface 14. Toner particles 28 are deposited by developing component 30 and the toner particles stick to charged portions of the drum 12 as indicated by dotted line 28. The developing component 30 can be, for example, a magnetic brush developer, or one of numerous types of developing components known by those skilled in the art. After the toner particles 28 are deposited onto the electrostatic latent image for development, the drum 12 advances the developed image to a transfer component 32 where a sheet of support material 34 (for example, paper) is moved into contact with the developed toner image in a timed sequence so that the developed image on the photoconductive surface 14 contacts the advancing sheet of support material 34 at transfer component 32. A charging device (not shown) can be provided for creating an electrostatic charge on the backside of support material 34 to aid in inducing the transfer of toner from the developed image on the photoconductive surface 14 to the support material 34. After image transfer to the support material 34, support material 34 is subsequently transported to a fusing component 36 that permanently affixes the transferred image to the support material 34, such as with pressure rollers 38, 40, heat, light, or a combination thereof, and a copy or print is ultimately removed by an operator. After the support material 34 is separated from the photoconductive surface 14 of the drum 12, some residual developing material can remain adhered to the photoconductive surface 14. Thus, a final processing component, such as cleaning component 42 and/or heat, can be provided for removing residual toner particles from photoconductive surface 14 subsequent to separation of support material 34 from drum 12. The cleaning component can include various mechanisms such as a simple blade or a rotatably mounted fibrous brush for physical engagement with photoconductive surface 14 to remove toner particles therefrom. The cleaning component can also include a discharge lamp for flooding the photoconductive surface with light in order to dissipate any residual electrostatic charge remaining thereon in prepared for a subsequent image cycle.

While currently available imaging systems are suitable for their intended purposes, these systems can require high voltage charging and high cost electronic components. In addition, current systems require use of dry toner which can be difficult to manage. Printing systems using electrically-controlled wetting have been proposed. However, such systems require matrices of actively electrically conducting material and controlling conductivity on an already wet surface can be difficult. Thus, there remains a need for an improved printing system and process that is energy efficient and less complex than currently available systems and processes.

SUMMARY

Described herein is a light controlled laser imaging method comprising exposing a surface layer of an imaging member substrate to a first expose source to render the surface layer uniformly hydrophilic, wherein the surface layer comprises a compound having reversible light controlled wettability whereby the surface layer is reversibly hydrophilic and hydrophobic; exposing the surface layer to a second expose source in an image-wise fashion to render image areas of the surface layer hydrophobic; exposing the surface layer to a polar liquid wherein the polar liquid attracts to non-image hydrophilic areas; exposing the surface layer to a hydrophobic liquid colorant wherein the hydrophobic liquid colorant attracts to hydrophobic image areas; contacting the surface layer with an image receiving substrate to transfer the image thereto; fixing the image; and optionally, treating the surface layer to remove residual hydrophobic liquid colorant.

Further described is an imaging member comprising a substrate; a surface layer disposed on the substrate, wherein the surface layer comprises a compound having reversible light controlled wettability whereby the surface layer is reversibly hydrophilic and hydrophobic; wherein exposure of the surface layer to a first expose source provides a uniformly hydrophilic surface for attracting a polar liquid; and wherein exposure of the surface layer to a second expose source in an image-wise fashion provides a surface having hydrophilic non-image areas and hydrophobic images areas for attracting a hydrophobic liquid colorant.

Also described is an image forming apparatus for forming images on a recording medium comprising a) an imaging member having a substrate and a surface layer disposed on the substrate, wherein the surface layer comprises a compound having reversible light controlled wettability whereby the surface layer is reversibly hydrophilic and hydrophobic; b) a first expose device that renders the surface layer uniformly hydrophilic; c) a second expose device that renders image areas of the surface layer hydrophobic; d) a liquid colorant source that contacts the exposed surface to a hydrophobic liquid colorant wherein the hydrophobic liquid colorant attracts to the hydrophobic image areas; d) a transfer component for transferring the image areas to another member or to a final recording substrate; e) a fixing member to fix the image to the final recording substrate; and d) optionally, a cleaning device for removing residual hydrophobic liquid colorant.

DETAILED DESCRIPTION

Described herein is a light controlled laser imaging method comprising exposing a surface layer of an imaging member substrate to a first expose source to render the surface layer uniformly hydrophilic, wherein the surface layer comprises a polymer film including a compound, such as an azo compound, having reversible light controlled wettability whereby the surface layer is reversibly hydrophilic and hydrophobic; exposing the surface layer to a second expose source in an image-wise fashion to render image areas of the surface layer hydrophobic; exposing the surface layer to a polar liquid wherein the polar liquid attracts to non-image hydrophilic areas; exposing the surface layer to a hydrophobic liquid colorant wherein the hydrophobic liquid colorant attracts and adheres to the hydrophobic image areas; contacting the surface layer with an image receiving substrate to transfer the image thereto; fixing the image; and optionally, treating the surface layer to return it to its original state.

Wettability is the tendency for a surface to attract or repel liquids. The laser imaging devices and methods herein employ surfaces having a wettability that can be controlled by exposure to different wavelengths of light to selectively attract liquid colorant to the surfaces and can be employed in copiers, printers, and multi-functional devices. The system and method is energy efficient and does not require high-voltage charging components required by conventional laser printing devices. Use of fluid colorant provides a simplified process and eliminates problems inherent in managing dry toner. The present system and method provide a simpler design having fewer high-cost electronic parts than conventional laser printers and is cost effective to produce. Further, currently available paper handling, laser imaging, and rasterization methods can be employed herewith.

An image forming apparatus for forming images on a recording medium comprises a) an imaging member having a substrate and a surface layer disposed on the substrate, wherein the surface layer comprises a compound having reversible light controlled wettability whereby the surface layer is reversibly hydrophilic and hydrophobic; b) a first expose device that renders the surface layer uniformly hydrophilic; c) a second expose device that renders image areas of the surface layer hydrophobic; d) a liquid colorant source that contacts the exposed surface to a hydrophobic liquid colorant wherein the hydrophobic liquid colorant attracts and adheres to the hydrophobic image areas; d) a transfer component for transferring the image areas to another member or to a final recording substrate; e) a fixing member to fix the image to the final recording substrate; and d) optionally, a cleaning device for removing residual hydrophobic colorant.

Figure 1:
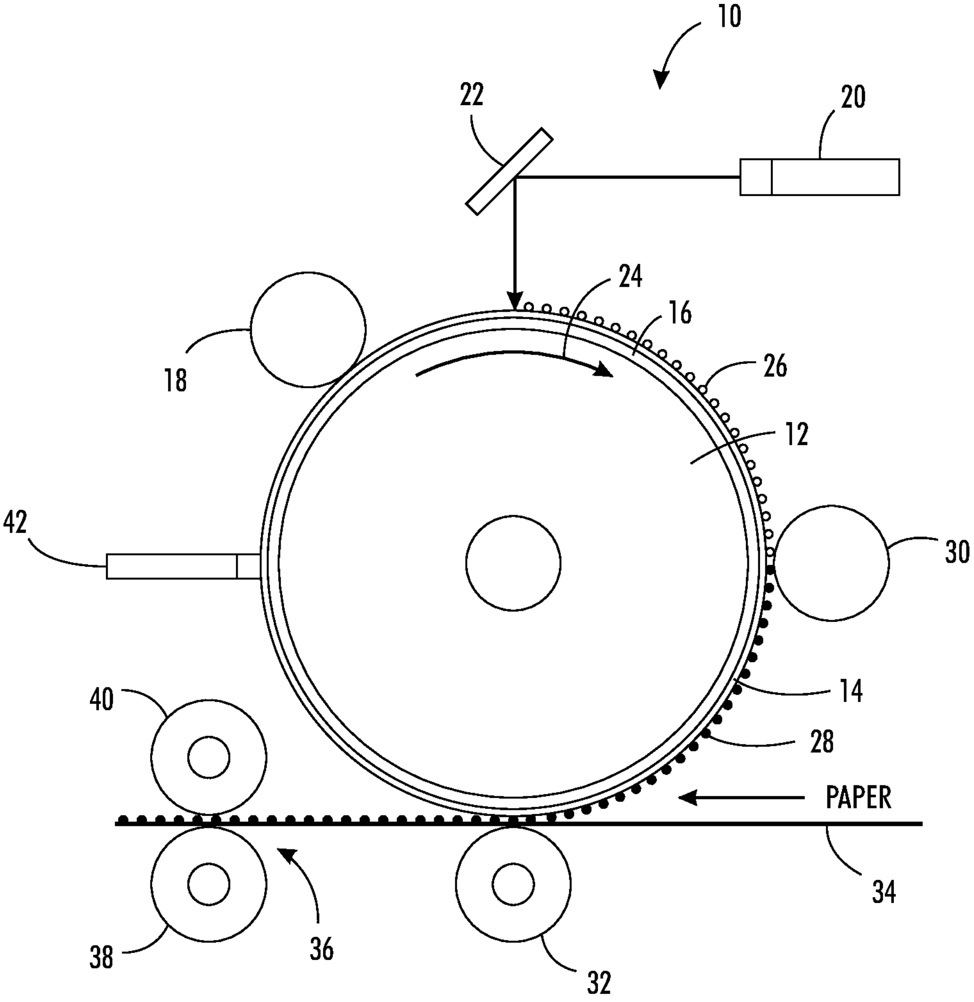
FIG. 1 illustrates a laser printing device generally.
Figure 2:
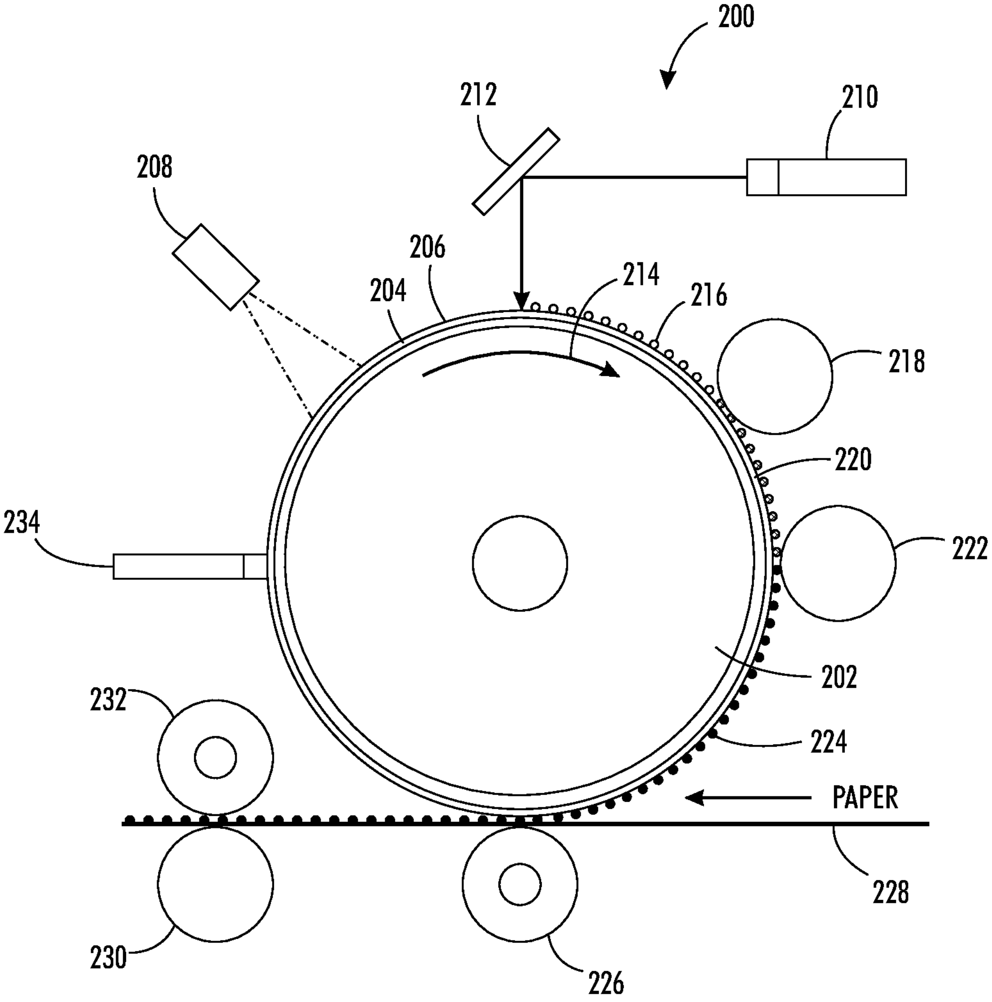
FIG. 2 illustrates a printing device and process in accordance with the present disclosure.

FIG. 2 illustrates an exemplary embodiment of a laser printing device 200 and process in accordance with the present disclosure. Device 200 includes cylinder 202 having disposed thereon layer 204 having a surface 206 wherein layer 204 comprises a material having reversible light controlled wettability whereby the surface 206 is reversibly hydrophilic and hydrophobic. The cylinder 202 is exposed to a first expose source, such as ultra-violet light source 208 to set or re-set the wettability characteristic of surface layer 206 to render the surface layer 206 uniformly hydrophilic.

An image 216 is projected or written onto cylinder 202 via laser 210, which includes mirror component 212, while the drum is rotating. A motor (not shown) engages the drum 202 for rotating the drum in the direction indicated by the arrow 214 to advance successive portions of the reversibly wettable surface layer 204 through the various processing components disposed about the path of movement of cylinder 202. In the areas where the laser 210 shines, the wettability on the surface 206 is changed and latent image areas 216 indicated by dotted line 216 become hydrophobic image areas.

Various known methods can be used to irradiate the surface layer 206 of the reversibly wettable layer 204 for recording the latent image thereon. For example, a properly modulated scanning beam of electromagnetic radiation (for example, a laser beam) can be used.

A polar liquid source 218 deposits polar liquid (for example, water, although not limited thereto), such as with a wetting roller, and the polar liquid is attracted to the non-image hydrophilic areas indicated by dotted line 220. For certain ink types, a wetting station may not be required.

The cylinder then moves in the direction of arrow 214 to a liquid colorant source 222 containing a supply of hydrophobic liquid colorant. Hydrophobic liquid colorant is deposited by liquid colorant source 222, such as by one or more rollers, and the hydrophobic liquid colorant attracts and adheres to the hydrophobic image-areas of the surface layer 204 as indicated by the dotted lines 224.

After the hydrophobic liquid colorant 224 is deposited onto the hydrophobic latent image for development, the cylinder 202 advances the developed image to a transfer component 226 where a sheet of support material 228 (for example, paper) is moved into contact with the developed hydrophobic liquid image in a timed sequence so that the developed image on the reversibly wettable surface 206 contacts the advancing sheet of support material 228 at transfer component 226.

After the image is transferred to the support material 228, support material 228 can be transported to a light source (not shown), a heat source (not shown), through pressure rollers 230, 232, or a combination thereof, that permanently affixes the transferred image to the support material 228, and a copy or print is ultimately removed by an operator.

After the support material 228 is separated from the surface 204 of the cylinder 202, some residual colorant material can remain adhered to the surface 206. Thus, a final processing component, such as cleaning component 234, heat, or a combination thereof, can be provided for removing residual liquid colorant from surface 206 subsequent to separation of support material 228 from cylinder 202. The cleaning component can include various mechanisms such as a simple blade or a rotatably mounted fibrous brush for physical engagement with surface 206 to remove toner particles therefrom.

Any desired or suitable material having reversible light controlled wettability can be used for the surface layer herein. As described, these materials or polymer films containing these materials are, in embodiments, imaged with light to create regions that attract hydrophobic ink and regions that repel hydrophobic ink. In an alternate embodiment, hydrophilic ink can be employed and the process reversed.

Figure 3:
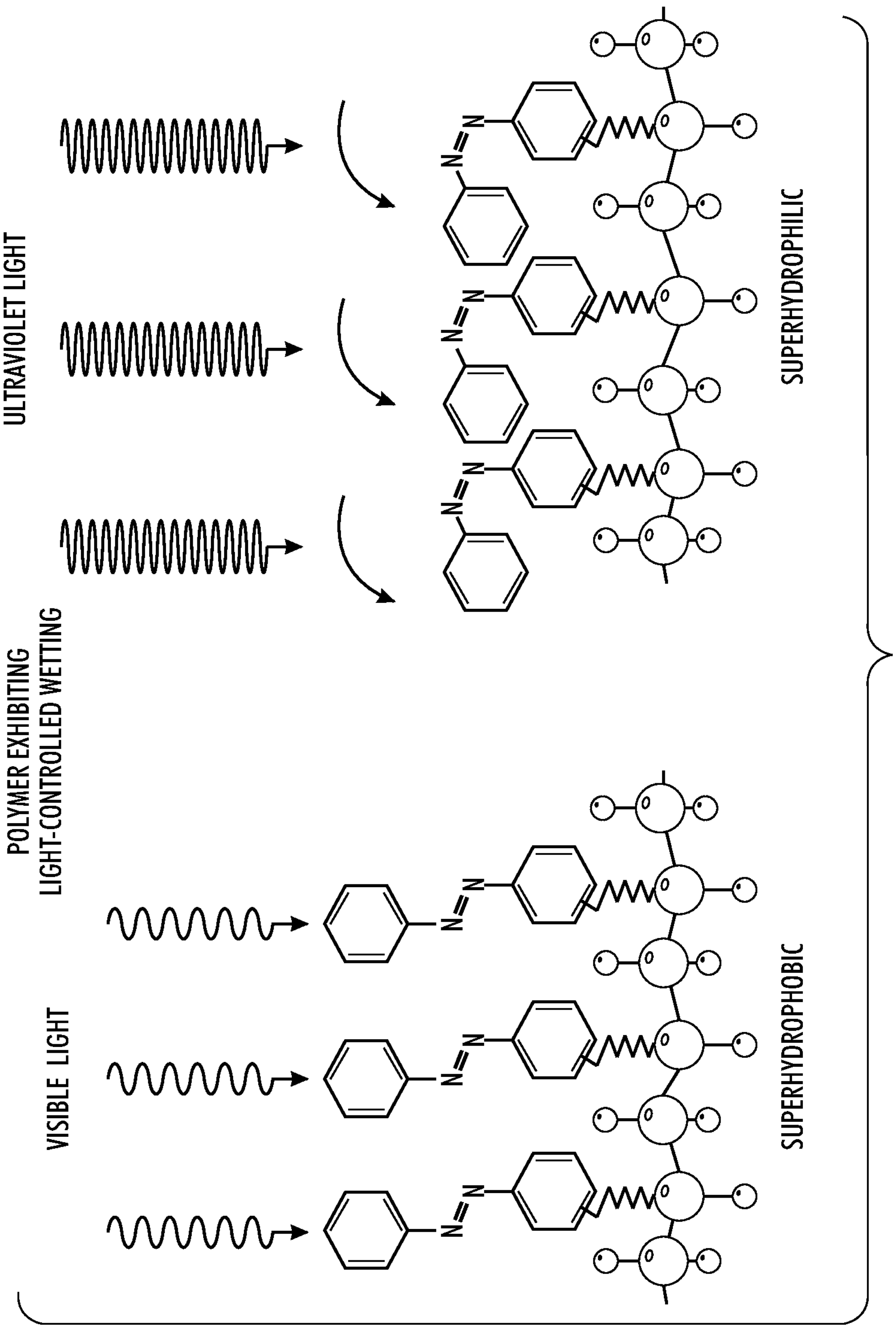
FIG. 3 illustrates a polymer exhibiting light-controlled wettability.

FIG. 3 illustrates an azobenzene polymer having light controlled wettability. The azobenzene molecule is known to undergo photoisomerization under different wavelengths of light. One form of the molecule is hydrophilic (cis form) and one form is hydrophobic (trans form). As shown in FIG. 3, upon exposure to visible light, azobenzene material takes on the trans form and is superhydrophobic. Superhydrophobic can be described as when a droplet of water or droplet of liquid forms a high contact-angle, such as greater than about 150°, although not limited. Conversely, upon exposure to ultraviolet light, azobenzene takes on the cis form and becomes superhydrophilic. Superhydrophilic can be described as when a droplet of water or droplet of other liquid forms a low contact angle such as less than about 90°, although not limited. This photoisomerization of azobenzene is extremely rapid, for example, on the order of seconds or picoseconds, although not limited.

The surface material having reversible light controlled wettability herein can be an azo compound of the formula

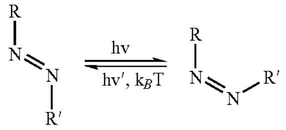

wherein R and R' can be any suitable component provided the material has the reversible light controlled wettability characteristic, for example, wherein R and R' are each independently selected from:

alkyl, wherein alkyl can be linear, branched, saturated, unsaturated, cyclic, substituted, and unsubstituted alkyl, and wherein hetero atoms or groups may be present; or aryl wherein aryl can be unsubstituted or substituted and wherein hetero atoms or groups may be present;

wherein hetero atoms or groups can be oxygen, nitrogen, sulfur, silicon, phosphorus atoms or groups, and the like.

Optionally, R and R' can be independently selected from:

alkyl having from about 1 to about 55 carbon atoms, although the number of carbon atoms can be outside of this range, wherein alkyl can be linear, branched, saturated, unsaturated, cyclic, substituted, and unsubstituted alkyl, and wherein hetero atoms such as oxygen, nitrogen, sulfur, silicon, phosphorus, and the like either may or may not be present in the alkyl; or aryl having from about 6 to about 26 carbon atoms, although the number of carbon atoms can be outside of this range, including unsubstituted and substituted aryl groups, and wherein hetero atoms, such as oxygen, nitrogen, sulfur, silicon, phosphorus, and the like either may or may not be present in the aryl.

In a specific embodiment, the surface material having reversible light controlled wettability comprises azobenzene of the formula

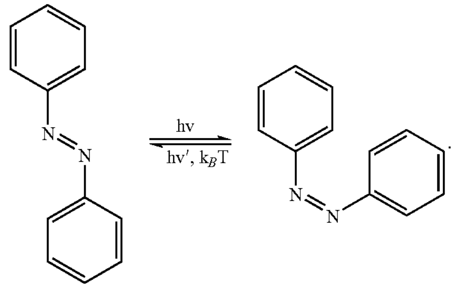 [SMILES: c1ccc(/N=N/c2ccccc2)cc1 ; c1ccc(/N=N\c2ccccc2)cc1]

In embodiments, a film comprising the surface material having reversible light controlled wettability is disposed about the cylinder. The film can include any suitable polymer film such as polyethylene terephthalate, polyethylene, polypropylene, polyester, polycarbonates, acrylic polymers, vinyl polymers, cellulose polymers, polysiloxanes, polyamides, polyurethanes, block, alternating, or random copolymers thereof, and mixtures thereof. In embodiments, the polymer can be selected to affect the wettability, for example, the polymer can be selected to increase the hydrophobic characteristic of the surface.

In another embodiment, the surface material having reversible light controlled wettability can comprise a nanostructured vanadium oxide film. For example, a nanostructured $V_2O_5$ film as described in Ho Sun Lim, et al., "UV-Driven Reversible Switching of a Roselike Vanadium Oxide Film between Superhydrophobicity and Superhydrophilicity," J. Am. Chem. Soc. 2007, 129, pp. 4128-4129, which is hereby incorporated by reference herein, can be used for the surface material herein.

Any desired or suitable colorant can be used in embodiments herein including toner-based colorants known for use in the lithographic arts. In a specific embodiment, a hydrophobic liquid colorant is used and can comprise a dye, a pigment, or a mixture thereof, although not limited. Examples of hydrophobic liquid colorants that can be used include pigments, dyes, mixtures of pigments and dyes, mixtures of pigments, mixtures of dyes, and mixtures and combinations thereof. Any dye or pigment may be selected, provided it is capable of being dispersed or dissolved in the ink, is compatible with the other ink components, and is or can be rendered hydrophobic.

The laser printing device and method herein has been described with respect to a surface layer comprising a compound having reversible light controlled wettability whereby the surface layer is reversibly hydrophilic and hydrophobic; wherein exposure of the surface layer to a first expose source provides a uniformly hydrophilic surface for attracting a polar liquid; and wherein exposure of the surface layer to a second expose source in an image-wise fashion provides a surface having hydrophilic non-image areas and hydrophobic images areas for attracting a hydrophobic liquid colorant.

In an alternate embodiment, a hydrophilic colorant can be used. In this embodiment, a light controlled laser imaging method includes exposing a surface layer of an imaging member substrate to a first expose source to render the surface layer uniformly hydrophobic, wherein the surface layer comprises a polymer film including a compound having reversible light controlled wettability whereby the surface layer is reversibly hydrophobic and hydrophilic; exposing the surface layer to a second expose source in an image-wise fashion to render image areas of the surface layer hydrophilic; exposing the surface layer to a non-polar liquid wherein the non-polar liquid attracts to non-image hydrophobic areas; exposing the surface layer to a hydrophilic liquid colorant wherein the hydrophilic liquid colorant attracts to hydrophilic image areas; contacting the surface layer with an image receiving substrate to transfer the image thereto; fixing the image; and optionally, treating the surface layer to remove residual hydrophilic liquid colorant.

Further contemplated is an imaging member and an image forming apparatus containing the imaging member comprising a substrate; a surface layer disposed on the substrate, wherein the surface layer comprises a compound having reversible light controlled wettability whereby the surface layer is reversibly hydrophobic and hydrophilic; wherein exposure of the surface layer to a first expose source provides a uniformly hydrophobic surface for attracting a non-polar liquid; and wherein exposure of the surface layer to a second expose source in an image-wise fashion provides a surface having hydrophobic non-image areas and hydrophilic images areas for attracting a hydrophilic liquid colorant. The present disclosure could also be adapted for other applications, such as a paint roller device that can be rolled on a surface, such as a wall, to deposit an image, stamps for depositing selected images, such as graphics or information, which can be employed in a movable inline manufacturing setting, although not limited.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims. Unless specifically recited in a claim, steps or components of claims should not be implied or imported from the specification or any other claims as to any particular order, number, position, size, shape, angle, color, or material.

The invention claimed is:

1. A light controlled laser imaging method comprising:

exposing a surface layer of an imaging member substrate to a first expose source to render the surface layer uniformly hydrophilic, wherein the surface layer comprises a compound having reversible light controlled wettability whereby the surface layer is reversibly hydrophilic and hydrophobic;

exposing the surface layer to a second expose source in an image-wise fashion to render image areas of the surface layer hydrophobic;

wherein the first expose source is an ultra-violet light expose source, and wherein the second expose source is a visible light expose source;

exposing the surface layer to a polar liquid wherein the polar liquid attracts to non-image hydrophilic areas;

exposing the surface layer to a hydrophobic liquid colorant wherein the hydrophobic liquid colorant attracts to hydrophobic image areas;

contacting the surface layer with an image receiving substrate to transfer the image thereto;

fixing the image; and optionally, treating the surface layer to remove residual hydrophobic liquid colorant.

2. The imaging method of claim 1, wherein the compound having reversible light controlled wettability is an azo compound of the formula

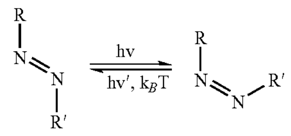

wherein R and R' are each independently selected from alkyl, wherein alkyl can be linear, branched, saturated, unsaturated, cyclic, substituted, and unsubstituted alkyl, and wherein hetero atoms may be present; or aryl wherein aryl can be unsubstituted or substituted and wherein hetero atoms may be present.

3. The imaging method of claim 2, wherein the azo compound comprises azobenzene of the formula

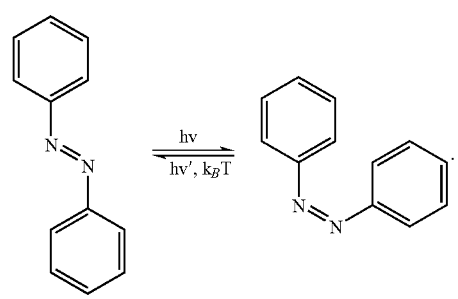 [SMILES: c1ccc(/N=N/c2ccccc2)cc1 ; c1ccc(/N=N\c2ccccc2)cc1]

4. The imaging member of claim 1, wherein the surface layer comprising a compound having reversible light controlled wettability comprises a polymer film including polyethylene terephthalate, polyethylene, polypropylene, polyester, polycarbonates, acrylic polymers, vinyl polymers, cellulose polymers, polysiloxanes, polyamides, polyurethanes, block, alternating, or random copolymers thereof, and mixtures thereof.

5. The imaging method of claim 1, wherein the compound having reversible light controlled wettability is a nanostructured vanadium oxide film.

6. The imaging method of claim 1, where the polar liquid comprises water.

7. The imaging method of claim 1, wherein the hydrophobic liquid colorant comprises a dye, a pigment, or a mixture thereof.

8. The imaging method of claim 1, wherein contacting the surface layer with an image receiving substrate comprises contacting the surface directly with a final recording substrate.

9. The imaging method of claim 1, wherein contacting the surface layer with an image receiving substrate comprises contacting the surface layer with an intermediate transfer member; and transferring the image to a final recording substrate or to another member.

10. The imaging method of claim 1, wherein fixing the image comprises exposing the image to a light source, exposing the image to a heat source, exposing the image to pressure, or a combination thereof.

11. An imaging member comprising:

a substrate;

a surface layer disposed on the substrate, wherein the surface layer comprises a compound having reversible light controlled wettability whereby the surface layer is reversibly hydrophilic and hydrophobic;

wherein exposure of the surface layer to a first expose source provides a uniformly hydrophilic surface for attracting a polar liquid; and wherein exposure of the surface layer to a second expose source in an image-wise fashion provides a surface having hydrophilic non-image areas and hydrophobic images areas for attracting a hydrophobic liquid colorant; and wherein the first expose source is an ultra-violet light expose source; and wherein the second expose source is a visible light expose source.

12. The imaging member of claim 11, wherein the compound having reversible light controlled wettability is an azobenzene of the formula

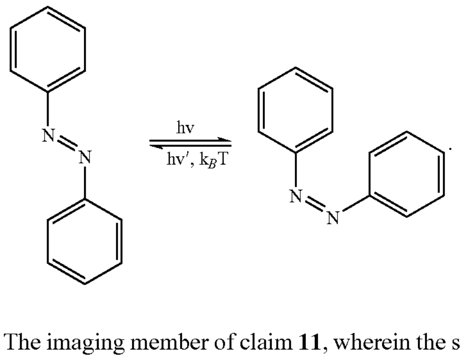

13. The imaging member of claim 11, wherein the surface layer comprising a compound having reversible light controlled wettability comprises a nanostructured vanadium oxide film.

14. The imaging member of claim 11, where the polar liquid comprises water.

15. An image forming apparatus for forming images on a recording medium comprising:

a) an imaging member having a substrate and a surface layer disposed on the substrate, wherein the surface layer comprises a compound having reversible light controlled wettability whereby the surface layer is reversibly hydrophilic and hydrophobic;

b) a first expose device that renders the surface layer uniformly hydrophilic;

c) a second expose device that renders image areas of the surface layer hydrophobic;

d) a liquid colorant source that contacts the exposed surface to a hydrophobic liquid colorant wherein the hydrophobic liquid colorant attracts to the hydrophobic image areas;

d) a transfer component for transferring the image areas to another member or to a final recording substrate;

e) a fixing member to fix the image to the final recording substrate; and d) optionally, a cleaning device for removing residual hydrophobic liquid colorant;

wherein the first expose device is an ultra-violet light expose device; and wherein the second expose device is a visible light expose device.

16. The image forming apparatus of claim 15, wherein the compound having reversible light controlled wettability comprises azobenzene of the formula

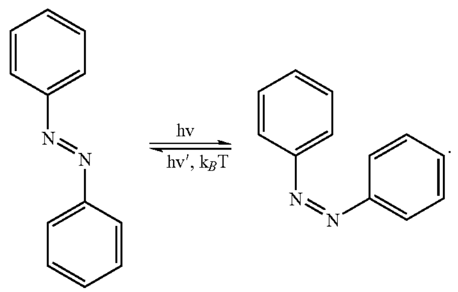 [SMILES: c1ccc(/N=N/c2ccccc2)cc1 ; c1ccc(/N=N\c2ccccc2)cc1]

17. A light controlled laser imaging method comprising:

exposing a surface layer of an imaging member substrate to a first expose source to render the surface layer uniformly hydrophobic;

wherein the surface layer comprises a compound having reversible light controlled wettability whereby the surface layer is reversibly hydrophobic and hydrophilic;

exposing the surface layer to a second expose source in an image-wise fashion to render image areas of the surface layer hydrophilic;

wherein the first expose source is an ultra-violet light expose source, and wherein the second expose source is a visible light expose source;

exposing the surface layer to a non-polar liquid wherein the non-polar liquid attracts to non-image hydrophobic areas;

exposing the surface layer to a hydrophilic liquid colorant wherein the hydrophilic liquid colorant attracts to hydrophilic image areas;

contacting the surface layer with an image receiving substrate to transfer the image thereto;

fixing the image; and optionally, treating the surface layer to remove residual hydrophilic liquid colorant.

18. An imaging member comprising:

a substrate;

a surface layer disposed on the substrate, wherein the surface layer comprises a compound having reversible light controlled wettability whereby the surface layer is reversibly hydrophobic and hydrophilic;

wherein exposure of the surface layer to a first expose source provides a uniformly hydrophobic surface for attracting a non-polar liquid; and wherein exposure of the surface layer to a second expose source in an image-wise fashion provides a surface having hydrophobic non-image areas and hydrophilic images areas for attracting a hydrophilic liquid colorant; and wherein the first expose source is an ultra-violet light expose source, and wherein the second expose source is a visible light expose source.

19. An imaging member comprising:

a substrate;

a surface layer disposed on the substrate, wherein the surface layer comprises a compound having reversible light controlled wettability whereby the surface layer is reversibly hydrophilic and hydrophobic;

wherein exposure of the surface layer to a first expose source provides a uniformly hydrophilic surface for attracting a polar liquid; and wherein exposure of the surface layer to a second expose source in an image-wise fashion provides a surface having hydrophilic non-image areas and hydrophobic images areas for attracting a hydrophobic liquid colorant; and wherein the compound having reversible light controlled wettability is an azobenzene of the formula

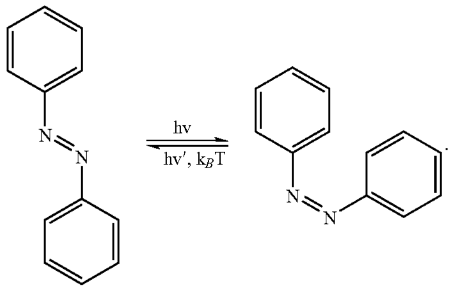 [SMILES: c1ccc(/N=N/c2ccccc2)cc1 ; c1ccc(/N=N\c2ccccc2)cc1]

* * * * *